United States Patent [19]

Joyce et al.

[11] Patent Number: 4,942,547
[45] Date of Patent: Jul. 17, 1990

[54] MULTIPROCESSORS ON A SINGLE SEMICONDUCTOR CHIP

[75] Inventors: Thomas F. Joyce, Westford, Mass.; Richard P. Kelly, Nashua, N.H.; Jian-Kuo Shen, Belmont; Michel M. Raguin, Medford, both of Mass.

[73] Assignee: Honeywell Bull, Inc., Waltham, Mass.

[21] Appl. No.: 131,246

[22] Filed: Dec. 7, 1987

Related U.S. Application Data

[63] Continuation of Ser. No. 722,237, Apr. 11, 1985, abandoned.

[51] Int. Cl.⁵ .............................................. G06F 7/38
[52] U.S. Cl. ..................................... 364/748; 364/736
[58] Field of Search ...................... 364/748, 755–757, 364/200 MS File, 736, 900 MS File, 762–764

[56] References Cited

U.S. PATENT DOCUMENTS

| | | | |
|---|---|---|---|
| 4,030,075 | 6/1977 | Barlow | 364/200 |
| 4,079,451 | 3/1978 | Woods et al. | 364/200 |
| 4,195,340 | 3/1980 | Joyce | 364/200 |
| 4,258,420 | 3/1981 | Negi et al. | 364/200 |
| 4,272,828 | 6/1981 | Negi et al. | 364/900 |
| 4,295,202 | 10/1981 | Joyce et al. | 364/748 |
| 4,295,203 | 10/1981 | Joyce | 364/748 |
| 4,305,134 | 12/1981 | Joyce et al. | 364/748 |
| 4,308,589 | 12/1981 | Joyce et al. | 364/748 |
| 4,384,340 | 5/1983 | Tague et al. | 364/736 |
| 4,384,341 | 5/1983 | Tague et al. | 364/763 |
| 4,390,961 | 6/1983 | Negi et al. | 364/756 |
| 4,405,992 | 9/1983 | Blau et al. | 364/748 |
| 4,423,483 | 12/1983 | Tague et al. | 364/200 |
| 4,426,680 | 1/1984 | Tague et al. | 364/200 |
| 4,442,498 | 4/1984 | Rosen | 364/748 |
| 4,451,883 | 5/1984 | Stanley et al. | 364/200 |
| 4,484,300 | 11/1984 | Negi et al. | 364/756 |
| 4,491,908 | 1/1985 | Woods et al. | 364/200 |

Primary Examiner—Gary V. Harkcom
Assistant Examiner—Long Thanh Nguyen
Attorney, Agent, or Firm—George Grayson; John Solakian

[57] ABSTRACT

A data processing system includes the functionality of a commercial instruction processor, a scientific instruction processor and a basic instruction processor integrated into a single semiconductor logic element.

8 Claims, 1 Drawing Sheet

MULTIPROCESSORS ON A SINGLE SEMICONDUCTOR CHIP

This application is a continuation of application Ser. No. 722,237, filed Apr. 11, 1985, now abandoned.

BACKGROUND OF THE INVENTION

1. Field of the Invention

The invention relates generally to data processing systems and more specifically to the integration of a commercial instruction processor, a scientific instruction processor and a central processor unit into a single integrated semiconductor chip.

2. Description of the Prior Art

Early data processing systems were designed as a business computer for processing COBOL instructions or as a scientific computer for processing Fortran instructions because the data processing systems were sold into different markets. As data processing system use expanded, business computers were expanded to include a scientific option and scientific computers were expanded to include a business option. The Honeywell H800 data processing system was designed as a business computer. Later systems included a scientific option. Similarly, the General Electric 600 was designed as a scientific computer. Later systems included a business option.

As the semiconductor community developed more sophisticated integrated circuits and as the use of data processing systems expanded, both the scientific and business capabilities were designed into the system.

Data processing systems evolved wherein the logic included a scientific instruction processor (SIP) and a commercial instruction processor (CIP). A central processor unit (CPU) in conjunction with the software operating system delegated scientific instructions to the SIP for execution and business instructions to the CIP for execution. Scientific instructions usually operated on floating point operands which included a mantissa and an exponent. Commercial instructions usually operated on binary coded decimal operands or binary operands in hexadecimal form.

Typical examples which show the operation of the SIP in a data processing system are U.S. Pat. No. 4,295,202 entitled "Hexadecimal Digit Shifter Output Control by a Programmable Read Only Memory", U.S. Pat. No. 4,295,203 entitled "Automatic Rounding Off of Floating Point Operands" and U.S. Pat. No. 4,308,589 entitled "Apparatus for Performing the Scientific Add Instruction".

U.S. Pat. No. 4,390,961 entitled "Data Processor Performing a Decimal Multiply Operation Using a Read Only Memory" and U.S. Pat. No. 4,272,828 entitled "Arithmetic Logic Apparatus for a Data Processing System" show typical examples of the operation of a CIP in a data processing system.

In addition, U.S. Pat. No. 4,258,420 entitled "Control File Apparatus for a Data Processing System" describes the use of a control file in the CIP for storing information received from the CPU. U.S. Pat. No. 4,272,828 entitled "Arithmetic Logic Apparatus for a Data Processing System describes the arithmetic logic apparatus in the CIP having two independent register files, one for each operand. This enhances the execution of arithmetic instructions.

U.S. Pat. No. 4,079,451 entitled "Word, Byte and Bit Indexed Addressing in a Data Processing System", U.S. Pat. No. 4,451,883 entitled "Bus Sourcing and Shifter Control of a Central Processing Unit" and U.S. Pat. No. 4,491,908 entitled "Microprogrammed Control of Extended Integer and Commercial Instruction Processor Instructions through Use of a Data Type Field in a Central Processor Unit" describe typical CPU operations.

The above-issued U.S. patents are assigned to Honeywell Information Systems Inc. and are herein incorporated by reference into this application.

Data processing systems described above have the disadvantage of having some duplication of function. This requires additional logic in the separate processors to perform these functions. In order to be competitive in today's marketplace, systems must be smaller and less costly than was previously acceptable.

OBJECTS OF THE INVENTION

Accordingly, it is an object of the invention to provide an improved data processing system.

It is also an object of the invention to provide an improved data processing system requiring fewer integrated circuits.

It is another object of the invention to provide an improved data processing system having fewer logic boards.

It is yet another object of the invention to provide a lower cost data processing system.

It is still another object of the invention to incorporate three processors into a single integrated circuit semiconductor chip.

It is also another object of the invention to incorporate a commercial instruction processor, a scientific instruction processor and a central processor unit into a single integrated circuit semiconductor chip.

SUMMARY OF THE INVENTION

A data processing system includes the functionality of a commercial instruction processor (CIP), a scientific instruction processor (SIP), and a central processor unit (CPU) integrated into a single semiconductor logic element. Included in the logic element are a decimal unit for processing signed and unsigned binary coded decimal and ASCII operands, a binary unit for processing binary integrated and floating point hexadecimal mantissa operands, and an exponent unit for processing floating point exponents.

Included in the logic element are a dual ported register file having addressable operand and scientific accumulator registers and a work area for normal scratchpad functions.

Also included in the logic element are a data in unit for receiving operands and instructions from a cache or main memory, an instruction prefetch unit for receiving instructions, a branch unit for recognizing the instruction operation code, and a next address logic unit for developing a read only store address of the location of the next firmware word to be applied to the logic element for executing the instructions.

A program counter stores the address in main memory of the current instruction being executed and is incremented to point to the address in main memory of the next instruction to be executed.

A number of indicator registers indicate the status of the operands and a number of mode registers provide control information for the execution of instructions.

BRIEF DESCRIPTION OF THE DRAWING

The novel features which are characteristic of the invention are set forth with particularity in the appended claims. The invention itself, however, both as to organization and operation may best be understood by reference to the following description in conjunction with the drawing in which:

DESCRIPTION OF THE PREFERRED EMBODIMENT

Figure 1:
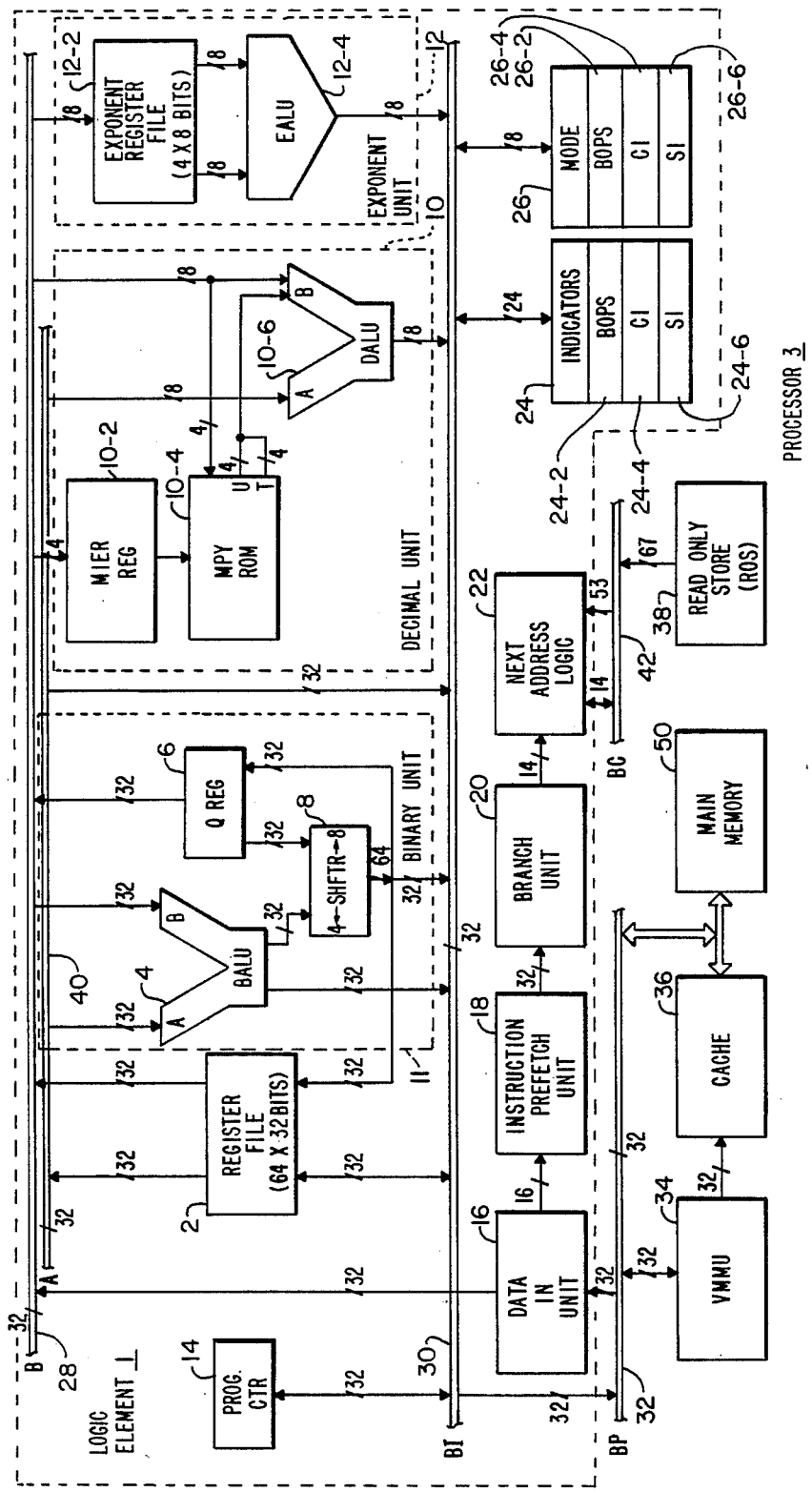
FIG. 1 shows a block diagram of the single logic element which includes a basic instruction processor, a scientific instruction processor and a commercial instruction processor.

FIG. 1 shows a block diagram of a data processing system 3, including a processor logic element which executes basic operating system instructions, commercial instructions and scientific instructions.

All data elements are based on 16 bit words stored in main memory 50. Data may be stored as bit, byte, word or multiword.

The processor logic element 1 is coupled to a virtual memory management unit (VMMU) 34, a cache memory 36 and the main memory 50 by a 32 bit BP bus 32.

The VMMU 34 translates a virtual address described in the instruction being executed into a physical address of main memory 50. The virtual address includes a ring number, a segment number and a displacement. This locates a process stored in the VMMU 34 and enables the VMMU 34 to send the physical address out on BP bus 32 to main memory 50 and directly from VMMU 34 to cache 36. The VMMU 34 and cache 36 operations are conventional for the purpose of understanding the invention.

The basic operating system instructions operate on data in a number of forms including the following data formats, the radix being to the right of the least significant bit.

(a) A signed integer data byte includes 7 data bits and a sign bit. Range (r) is $-2^7 \leq r \leq 2^7 - 1$.
(b) A sign extended integer byte in a word includes 7 data bits following 9 sign bits. $r = -2^7 \leq r \leq 2^7 - 1$.
(c) A signed integer data word includes 15 data bits and a sign bit. $r = -2^{15} \leq r \leq 2^{15} - 1$.
(d) A sign extended integer word in a double word includes 15 data bits following 17 sign bits. $r = -2^{15} \leq r \leq 2^{15} - 1$.
(e) A signed integer double word includes 31 data bits and a sign. $r = -2^{31} \leq r \leq 2^{31} - 1$.
(f) A signed integer quad word includes 63 data bits and a sign bit.

The following unsigned integer data types are included:
(a) An integer byte including 8 data bits. $r = 0 \leq r \leq 2^8 - 1$.
(b) An integer word including 16 data bits. $r = 0 \leq r \leq 2^{16} - 1$.
(c) An integer word in a double word including 16 data bits following 16 ZERO bits. $r = 0 \leq r \leq 2^{16} - 1$.
(d) An integer double word including 32 data bits. $r = 0 \leq r \leq 2^{32} - 1$.
(e) An integer quad word including 64 data bits. $r = 0 \leq r \leq 2^{64} - 1$.

The commercial instructions operate on three data types:
(a) decimal (BCD) strings;
(b) alphanumeric (ASCII) strings; and
(c) binary numbers (16 or 32 bit).

The scientific instructions operate on two data types:
(a) Hexadecimal floating point including an exponent (e) of 7 data bits in excess 64 form, a sign bit (s) and a mantissa (f) of 6 hexadecimal digits or 14 hexadecimal digits. The range of the fractional mantissa (f) is $$0 \leq f \leq \frac{(16^6 - 1)}{16^6}$$

and for the double word the range is $$0 \leq f \leq \frac{(16^{14} - 1)}{16^{14}}.$$

The value of the floating point number is $(-1)^s \times f \times 16^{(e-64)}$.

(b) A signed integer number (i) of 16 bits for a single word and 32 bits for a double word.

The integer (i) in two's complement form has a range of $-2^{15} \leq i \leq 2^{15} - 1$ for a single word and $-2^{31} \leq i \leq 2^{31} - 1$ for a double word.

The basic operating system instructions include the normal:
Load, store and swap between registers and memory;
Compare—add, subtract, multiply and divide operations; and
OR, AND and exclusive OR logic operations.

For commercial instruction decimal data type, the operations include:
arithmetic—add, subtract multiply and divide;
decimal comparison;
conversion between decimal data formats;
conversion to binary
decimal shift; and
numeric string edit.

The alphanumeric operations include:
alphanumeric comparison;
translation by character;
string search—identify equality;
string verify—detect inequality;
string move; and
alphanumeric string edit.

The binary operation is one of:
conversion to decimal string.

The scientific instructions include:
scientific add;
scientific compare;
scientific add, subtract, multiply and divide;
scientific store; and
scientific swap.

A register file 2 includes sixty-four 32 bit registers. A number of program visible registers of register file 2 can be loaded and read by various instructions of the Honeywell Level 6 instruction set. The instruction set is described in the Honeywell Level 6 Minicomputer System Handbook, October 1978, Order Number CC71.

There are seven general word operand registers, nine address registers, seven general double word operand registers, two control registers, three scientific accumulators and one descriptor segment base register.

The general word operand registers R1 through R7 are 16 bit word operand general registers and accumulators. They are also used as index registers.

The address registers are 32 bits long. Registers B1 through B7 are base registers, RDBR is the remote descriptor base register, and T is the stack pointer. Registers B1 through B7 are used for formatting addresses.

The double word operand registers K1 through K7 are 32 bit double word general registers and accumulators. They can also be used for indexing.

The control register, the S register, stores the process status security keys. The register indicates the following:

(a) that all of the subsystems have successfully passed a quality logic test (QLT) program; and (b) the current security ring is being processed.

The processor 3 supports a number of rings, typically four. Rings are a part of the secure data system. All software including operating system software and applications software are dedicated to an assigned ring. Preassigned codes are required to allow one to access software in a particular ring as part of the security system.

A ring alarm register in register file 2 detects whether the software has crossed from a high security ring to a lower security ring.

Also included are three scientific accumulators SA1, SA2 and SA3 which store the mantissas of the floating point operands. Each mantissa in hexadecimal form may be stored in a 32 bit (two words) field or a 64 bit (four words) field. The 7 bit exponents and their respective sign bit are stored in three 8 bit registers of a 4×8 bit exponent register file 12-2.

The descriptor segment base register is stored in four words to define the processor addressing mode and the current process address space.

The processor 3 supports two addressing modes, absolute addressing mode (AAM) and translate addressing mode (TAM). The processor 3 is initially in AAM until the descriptor base register is loaded, at which time the processor 3 enters TAM, the normal addressing mode of the processor. During AAM, the processor 3 interprets all virtual addresses as physical addresses, that is, no address translation is performed. When in TAM, the processor 3 translates all virtual addresses to physical addresses by using segmented paging tables.

The register file 2 provides registers for defining the parameters of a stack in main memory 50 for each interrupt level of the system. The stack is used for storing operands or instructions. The contents of a stack address pointer stored in register file 2 points to the first word of the four word stack header. The stack header defines the number of words in the addressed stack and also the number of words currently consumed by the stack.

The register file 2 also provides a working area to store current operands being processed as well as storage for partial products or partial quotients being developed during the execution of a multiply or divide instruction.

In addition to the register file 2, a number of separate registers are provided to speed up the processing time of logic element 1.

A program counter 14 stores the address of the current instruction being executed. It is normally incremented to point to the next instruction except when a jump or branch is indicated.

An indicator register 24 includes a basic operating system (BOPS) register 24-2, a commercial indicator (CI) register 24-4, and a scientific indicator (SI) register 24-6. The BOPS register 24-2 contains the program status indicators for the operating system instructions including:

(a) an overflow indicator;

(b) a carry indicator;

(c) a bit test indicator representing the state of the last bit tested;

(d) an input/output (I/O) indicator representing whether the last peripheral device accepted an I/O command sent to it;

(e) a "greater than" result of a latest compare operation;

(f) a "less than" result of a latest compare operation; and (g) an "unlike signs" result of a latest compare operation.

The contents of the CI register 24-4 indicates:

(a) an overflow indicator set during a decimal operation if the result is too large for the receiving field or a divide by ZERO condition is detected;

(b) a truncation indicator set during an alphanumeric operation if the result is too large for the receiving field;

(c) a sign fault indicator set during a decimal operation when a negative result is stored in an unsigned field;

(d) a "greater than" bit set when the result is greater than ZERO for decimal arithmetic operations or the first operand is greater than the second operand desiring a decimal or alphanumeric comparison;

(e) a "less than" bit set when the result is less than ZERO during decimal arithmetic instructions or the first operand is smaller than the second operand for either decimal or arithmetic comparisons.

The contents of the SI register 24-6 indicates:

(a) an exponent underflow bit set when the result of the floating point operation has an exponent value smaller than allowed;

(b) a significant error bit set if an integer is truncated during a floating point to integer conversion operation;

(c) a precision error bit set when a non-ZERO portion of a fraction is truncated during a floating point to integer conversion operation;

(d) a "greater than" bit may only be changed during a compare operation;

(e) a "less than" bit may only be changed during a compare operation.

A mode register 26 includes two BOPS registers 26-2, a CI register 26-4 and two SI registers 26-6.

A first BOPS register 26-2 contains trap enable mode control keys associated with an R1 through R7 register overflow. Similarly a second BOPS register 26-2 contains trap enable mode control keys associated with a K1 through K7 register overflow.

The CI register 26-4 contains trap enable mode control keys for an overflow trap and a truncation trap for commercial instructions.

The first SI register 26-4 includes:

(a) a bit when set to ZERO indicating a truncate mode and when set to ONE indicating a round mode;

(b) two bits for each scientific accumulator SA1, SA2 and SA3 indicating the length of the main memory field (two or four words) and the length of the accumulator field in register file 2 (two or four words).

The second SI register 26-6 stores three enable trap bits for an exponent underflow, a significant error and a precision error, respectively.

During the execution of an instruction, the program counter 14 is incremented to point to the location in main memory 50 storing the next instruction. The next instruction is received by the data in unit 16 from the VMMU 34 or the cache 36 over a 32 bit BP bus 32. The instruction is assembled in the instruction prefetch unit 18 and then transferred to a branch unit 20. There the OP code is decoded, the state of the indicator registers 24 and the mode registers 26 is examined to determine if special handling of the instruction is required. A next address logic 22 receives 14 bits to generate the starting address which is sent to a read only store (ROS) 38 over a 67 bit BC bus 42 to provide a 67 bit microword to control the execution of the instruction by processor 3.

The binary and hexadecimal mantissa operands are processed through a binary unit 11 which includes a binary arithmetic logic unit (BALU) 4, a Q register 6 and a shifter 8. The binary coded decimal and the ASCII operands are processed through a decimal unit 10 which includes a decimal arithmetic logic unit (DALU) 10-6, a multiplier register 10-2 and a multiply read only memory 10-4. An exponent unit processes the exponent portions of floating point operands and includes a 4×8 bit exponent register file 12-2 and an exponent arithmetic logic unit (EALU) 12-4.

The operands specified by the instruction are received by the data in unit 16 and stored in the registers of register file 2 indicated by the 67 bit microword from ROS 38. The operand is transferred to register file 2 from data in unit 16 via a 32 bit B bus 28, a B side of the BALU 4, a 32 bit BI bus 30 either directly or via shifter 8, to register file 2. This positions the operand in the register of register file 2. For a floating point number, the mantissa is stored in register file 2 and the exponent and sign are stored in the 4×8 bit exponent register file 12-2.

A 32 bit Q register 6 acts as an extension to the BALU 4 to process 64 bit operands. The Q register 6 also stores partial products and partial quotients during the execution of binary multiplication and division instructions for subsequent transfer to the register file 2.

The Q register 6 is operative with the shifter 8 for equalizing the exponents during the execution of scientific add and scientific subtract instructions.

The shifter 8 is operative with the B side of the BALU 4 for executing the normal 32 bit binary shift operations, left shift, right shift, left shift around and right shift around. The shifter 8 is operative with the Q register 6 and the BALU 4 to execute the 64 bit binary shift operations.

For the simple binary arithmetic add and subtract operations, simultaneously a first operand is read from an A address location in register file 2 and a second operand is read from a B address location in register file 2. Both the first and second operands are applied to the A and B inputs respectively of BALU 4 and the result stored back into a predetermined location in register file 2. That location would usually be the location from which either the first or second operand was read.

Binary coded decimal (BCD) operand instructions are executed by decimal unit 10. BCD operands from register file 2 are simultaneously applied to an arithmetic logic unit (DALU) 10-6 and the result stored back in register file 2.

The decimal division instruction is executed by a series of successive subtractions. The decimal multiplication instruction is executed by storing each multiplier digit in an MIER register 10-2 for addressing a multiply ROM 10-4. Each multiplicand digit from register file 2 in turn also addresses multiply ROM 10-4 to read out a units partial product decimal digit and a tens product decimal digit into the B side of DALU 10-6. Each units partial product decimal digit is added to its respective, previously stored partial product decimal digit to generate a new partial product decimal digit for storage in register file 2 at the location from which the previously stored partial product decimal digit was read. Similarly, the next higher previously stored decimal digit is added to the tens partial product decimal digit to replace the previously stored partial product decimal digit. This process continues until the high order multiplier decimal digit is processed through the MIER register 10-2. The last partial product then becomes a product of the multiplication.

The exponents are stored in the 4×8 bit exponent register file 12-2. During the multiplication operation, the exponents are added in the EALU 12-4 and the exponent representing the product is stored back in the 4X8 bit exponent register file 12-2. Since the floating point mantissas are stored as fractions with the high order hexadecimal digit being immediately placed to the right of the decimal point, the product operand stored in the register file is normalized through the B side of the BALU 4, the Q register 6 and the shifter 8 and stored back in register file 2. The exponent is adjusted to reflect the number of hexadecimal digits shifted by the EALU 12-4. The product noramlized mantissa and exponent is stored back in main memory 50 via the BI bus 30 and the BP bus 32 at an address specified by the instruction.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A data processing system includes apparatus for performing the functionality of a basic operating system instruction processor, a scientific instruction processor and a commercial instruction processor integrated into a single semiconductor logic chip, said apparatus comprising:

register file means for storing a plurality of operands including floating point operands, binary coded decimal operands and basic operating system operands;

binary unit means coupled to said register file means for processing mantissas of said floating point operands, and binary data of said basic operating system operands;

decimal unit means coupled to said register file means for processing said binary coded decimal operands; and exponent unit means coupled to said register file means for processing exponents of said floating point operands; and instruction processing means coupled to said register means, binary unit means, decimal unit means, and exponent unit means, for processing computer instructions for steering operands to be processed which are held in said register file means to the appropriate ones of said units;

wherein a first result of processing said floating point operands, said binary coded decimal operands and said basic operating system operands is stored back in said register file means.

2. The apparatus of claim 1 wherein said binary unit means comprises:

first arithmetic logic unit means for performing an arithmetic operation on a first and a second mantissa, said first and second mantissas being received simultaneously from said register file means;

said first arithmetic logic unit means generating a third mantissa indicating a second result of said arithmetic operation;

said first arithmetic logic means for performing said arithmetic operation on a first and a second binary data word being received simultaneously from said register file means; and said first arithmetic logic means generating a third binary data word indicating a third result of said arithmetic operation.

3. The apparatus of claim 2 wherein said binary unit means further comprises:

shifter means coupled to said first arithmetic logic unit means and said register file means for shifting said third binary data word received from said first arithmetic logic unit means a predetermined amount when indicated by said arithmetic operation thereby generating a fourth binary data word for storage in said register file means.

4. The apparatus of claim 3 wherein said binary unit means further comprises:

Q register means coupled to said shifter means, said first arithmetic logic unit means and said register file means for shifting a double length operand a predetermined amount for storage of said shifted double length operand in said register file means.

5. The apparatus of claim 4 wherein said Q register means is further coupled to said shifter means for receiving partial products and partial quotients during a multiply and divide operation, respectively, for transfer to said register file means.

6. The apparatus of claim 5 wherein said decimal unit means comprises:

multiplier register means coupled to said register file means for storing successive multiplier digits of said second of said plurality of operands during said multiply operation;

read only memory means coupled register to said multiplier means and said register file means for receiving each of said successive multiplier digits from said multiplier register means and each multiplicand digit in turn from said register file means for generating a units partial product and a tens partial product; and second arithmetic logic unit means coupled to said register file means and said read only memory means for receiving a previous partial product from said register file means, and said units and said tens partial products from said read only memory means for generating a next partial product for storage in said register file means.

7. The apparatus of claim 6 wherein said exponent unit means comprises:

exponent register file means coupled to said register file means for receiving exponents of said floating point operands; and third arithmetic logic unit means coupled to said exponent register file means and said register file means for adding a first and a second exponent during a floating point multiply operation and subtracting said first and said second exponent during a floating point divide operation for storage in said register file means.

8. A data processing system includes a memory subsystem for storing information in the form of operands and instructions, a control store for storing firmware words and apparatus integrated into a single semiconductor logic chip for executing said instructions, said instructions being in the form of basic operating system instructions, scientific instructions and commercial instructions, said basic operating system instructions operating on binary operands, said scientific instruction operating on floating point operands and said commercial instructions operating on binary coded decimal operands, said apparatus comprising:

program counter means coupled to said memory subsystem for generating an address in said memory subsystem of a next instruction to be executed;

data in means coupled to said memory subsystem for receiving said next instruction from said memory subsystem;

control store address means coupled to said data in means for receiving an operations code included in said next instruction for generating a control store address, said control store being responsive to said control store address for reading out a firmware word;

register file means coupled to said data in means and said control store and responsive to an address portion of said next instruction and said firmware word for generating an address of an operand in said memory subsystem, said memory subsystem being responsive to said address for reading out said operand for transfer to said data in means;

binary unit means coupled to said data in means for receiving said operand, said register file means being coupled to said binary unit means for storing said operand received from said binary unit means if said operand is a binary operand of a binary coded decimal operand, and storing a mantissa if said operand is a floating point operand;

exponent unit means coupled to said register file means for storing an exponent of said operand if said operand is said floating point operand decimal unit means coupled to said register file means and said control store means for performing arithmetic operations specified by said operations code specifying said commerical instructions on said binary coded decimal operands received from said register means;

said binary unit means coupled to said register file means and said control store means for performing arithmetic operations specified by said operation code specifying said basic operating system instructions on said binary operand, received from said register file means, and performing arithmetic operations specified by said operation code specifying said scientific instructions on said mantissas received from said register file means; and said exponent unit means coupled to said control store means for performing said arithmetic operations specified by said operation code specifying said floating point instructions on said exponents;

wherein a result of said arithmetic operation is stored in said register file means.

* * * * *